United States Patent [19]

Hutchinson

[11] 3,962,370

[45] June 8, 1976

[54] SHAPED POLYMERIC ARTICLES

[75] Inventor: Francis Gowland Hutchinson, Runcorn, England

[73] Assignee: Imperial Chemical Industries Limited, London, England

[22] Filed: Sept. 17, 1974

[21] Appl. No.: 506,778

Related U.S. Application Data

[63] Continuation of Ser. No. 203,067, Nov. 29, 1971, abandoned.

[30] Foreign Application Priority Data

Dec. 11, 1970 United Kingdom............... 58947/70

[52] U.S. Cl..................... 260/859 R; 260/77.5 CR; 260/42.17; 260/42.18
[51] Int. Cl.² ........................................ C08L 75/04
[58] Field of Search ..................... 260/859, 77.5 CR

[56] References Cited
UNITED STATES PATENTS

| | | | |
|---|---|---|---|
| 3,028,367 | 4/1962 | O'Brien | 260/859 |
| 3,245,941 | 4/1966 | Mayer | 260/77.5 CR |
| 3,284,415 | 11/1966 | Horvath | 260/77.5 CR |
| 3,509,234 | 4/1970 | Burlant | 260/859 |
| 3,532,652 | 10/1970 | Zang | 260/859 |
| 3,660,359 | 5/1972 | Labana | 260/77.5 CR |
| 3,681,289 | 8/1972 | Kruse | 260/77.5 CR |

*Primary Examiner*—Carman J. Seccuro
*Attorney, Agent, or Firm*—Cushman, Darby & Cushman

[57] ABSTRACT

A shaped polymeric article comprising from 1% to 60% by weight, preferably from 5% to 30% by weight of a cross-linked polymeric material having a glass-rubber transition temperature of not more than 25°C and from 99% to 40% by weight, preferably from 95% to 70% by weight, of a vinyl polymer, in which the cross-linked polymeric material is formed from precursors therefor comprising at least one polymer, having a glass-rubber transition temperature of not more than 25°C, at least 80% by weight of said polymer having a molecular weight of at least 3000, and preferably consisting of at least one polymer having a glass-rubber transition temperature of not more than 25°C and a molecular weight of at least 3000, and at least on cross-linking agent reactive with said polymer.

18 Claims, No Drawings

SHAPED POLYMERIC ARTICLES

This is a continuation of application Ser. No. 203,067, filed Nov. 29, 1971, now abandoned.

This invention relates to shaped polymeric particles and in particular to shaped polymeric articles containing a substantial proportion of a vinyl polymer, and to a method of production of said articles.

The present invention provides shaped polymeric articles containing a substantial proportion of a vinyl polymer and having improved toughness as reflected in improved impact strength and/or improved ductile behaviour at low strain rates when compared with the vinyl polymer alone. The articles, which are often clear and transparent, possess a useful combination of mechanical and thermal properties.

According to the present invention we provide a shaped polymeric article comprising from 1% to 60% by weight of a cross-linked polymeric material having a glass-rubber transition temperature (Tg) of not more than 25°C and from 99% to 40% by weight of a vinyl polymer, in which the cross-linked polymeric material is formed from precursors therefor comprising at least one polymer having a glass-rubber transition temperature (Tg) of not more than 25°C, at least 80% by weight of the polymer having a molecular weight of at least 3000, and at least one cross-linking agent reactive therewith.

The properties of the shaped polymeric articles of our invention in which the polymer is cross-linked are superior to the properties of articles in which the polymer is uncross-linked, and in particular have superior impact strength.

By molecular weight we mean number average molecular weight. The temperature of the glass rubber transition may be measured on a Du Pont 900 thermal analyser, the rate of heating of the sample being 20°C per minute or may be measured on a Torsion Pendulum operating at 1 Hz.

The Tg of the cross-linked polymeric material in the shaped article of our invention may be determined by analysing in a Du Pont 900 Thermal Analyser a sample of the said shaped articles containing the cross-linked polymeric material, or, more conveniently, where the article contains only a low concentration of cross-linked polymeric material, by measurement using a Torsion Pendulum By vinyl polymer we mean a polymer of at least one vinyl monomer, that is, a polymer formed by polymerisation of one or more monomers containing ethylenic unsaturation in a terminal group.

The cross-linked polymeric material may be derived from a plurality of polymers some of which may have a molecular weight of less than 3000. However, at least 80% by weight of said polymers should have a molecular weight of at least 3000 and it is preferred, on account of the properties of the shaped articles derived therefrom, that the cross-linked polymeric material be formed from precursors therefor consisting of at least one polymer having a molecular weight of at least 3000 and a Tg of not more than 25°C and at least one cross-linking agent reactive therewith.

In general we find that the impact strengths of the shaped articles of our invention are greater the greater is the proportion of cross-linked polymeric material in the article. However, at high proportions of cross-linked polymeric material within the scope of our invention, although the impact strengths may be very high some other properties of the articles e.g. the flexural properties may decrease with increase in the proportion of cross-linked polymeric material in the article. Although the proportion of cross-linked polymeric material to vinyl polymer in the article will be chosen so as to result in properties in the article suitable for the desired application of the article we find that it is preferred, where a good combination of properties is desired, for the article to comprise from 2% to 30%, preferably from 5% to 30%, by weight of cross-linked polymeric material, and from 98% to 70%, preferably from 95% to 70%, by weight of vinyl polymer. For the best combination of properties it is preferred that the article comprise from 10% to 20% by weight of cross-linked polymeric material and from 90% to 80% by weight of a vinyl polymer.

It is preferred, in order that the shaped article should have particularly desirable impact properties at normal temperatures that both the polymer and the cross-linked polymeric material produced from the polymer have a Tg of not more than 0°C. Indeed, it is desirable, in order that the shaped article may have improved impact resistance at the temperature at which the shaped article is to be used, that the Tg of the polymer and the cross-linked polymeric material produced from the polymer have a Tg less than and preferably at least 20°C less than, the lowest temperature at which the shaped article is to be used.

The molecular weight of the polymer from which the cross-linked polymer is derived also has a bearing on the properties of the shaped article, and in particular on the impact strength of the article.

In order that the shaped article may have a particularly desirable impact strength it is desirable that the molecular weight of the polymer from which the cross-linked polymeric material is derived is at least 5,000, preferably at least 7,000, and most preferably at least 20,000.

Suitable polymers from which the cross-linked polymeric materials in the shaped articles of our invention may be produced include, for example, polymers of conjugated diolefines, e.g. polybutadiene and polyisoprene. In this case a suitable cross-linking agent is sulphur monochloride.

The polymer from which the cross-linked polymeric material may be produced may be a polymer containing a plurality of carboxyl or anhydride groups and the cross-linking agent may be a diepoxide or a polyepoxide. Alternatively, the polymer may contain a plurality of epoxide groups and the cross-linking agent may be a diacid or polyacid or a dianhydride or a polyanhydride.

Other suitable precursors of the cross-linked polymeric material include a polymer containing a plurality of hydroxyl groups and, as cross-linking agent, an adduct of formaldehyde and urea or melamine, or etherified derivatives of said adducts.

In the shaped articles of our invention the cross-linked polymeric material may be a cross-linked polyurethane formed from a polymer containing a plurality of groups reactive with isocyanate groups, and a cross-linking agent which is a diisocyanate or a polyisocyanate. Suitable groups reactive with isocyanate groups include, for example, hydroxyl, carboxyl and amine groups. The functionality of the polymer and the polyisocyanate must be such that they are capable of reacting to form a cross-linked polyurethane.

In our British Patent Specification No. 1,239,701 we have described shaped polymeric articles formed of a cross-linked polyurethane and a vinyl polymer and a process for making said articles in which the precursors from which the polyurethane is formed are generally of low molecular weight. We have found that the articles of the present invention show substantial advantages over articles made according to the aforementioned specification in that, as in the present invention a polymer having a molecular weight of at least 3,000 is used in the production of the cross-linked polymer, the amount of polyisocyanate used to effect cross-linking is substantially smaller than was necessary in the process described in the aforementioned specification, and as a consequence, the colour which may develop in the articles due to the presence of isocyanate groups is considerably less in articles made according to the present invention.

Suitable polymers having a Tg of not more than 25°C and a molecular weight of at least 3,000 and which contain groups reactive with isocyanate groups include copolymers of alkyl acrylates and/or alkyl alkacrylates, e.g. alkyl methacrylates, with monomers containing hydroxyl groups, e.g. hydroxy alkyl acrylates and/or hydroxy alkyl alkacrylates, e.g. hydroxyalkyl methacrylates. For example, the alkyl acrylate or alkyl alkacrylate may be ethyl acrylate, butyl acrylate, nonyl acrylate or methacrylate, or lauryl acrylate or methacrylate, and the hydroxy alkyl acrylate or alkacrylate may be, e.g. hydroxyethyl acrylate, hydroxypropyl acrylate, hydroxyethyl methacrylate or hydroxypropyl methacrylate. A suitable polymer is a copolymer of butyl acrylate and hydroxyethyl methacrylate.

Other polymers which may be mentioned include, for example, copolymers of olefins with monomers copolymerisable therewith and which contain e.g. —OH or —COOH groups, or groups which can subsequently be converted into —OH or —COOH groups. Suitable polymers are, for example, ethylene/vinyl acetate copolymers which have been partially or completely hydrolysed and copolymers of ethylene with vinyl acetate or an alkyl acrylate or alkacrylate, e.g. an alkyl methacrylate, and a hydroxyalkyl acrylate or alkacrylate, e.g. a hydroxyalkyl methacrylate. For example, the polymer may be a copolymer of ethylene, methyl methacrylate or ethyl acrylate and hydroxy ethyl methacrylate.

The polyisocyanate may be aliphatic, aromatic or cycloaliphatic or contain a plurality of groups selected from aliphatic, aromatic, and cycloaliphatic isocyanate groups. Polyisocyanates which may be mentioned include pentamethylene diisocyanate, hexamethylene diisocyanate, toluene 2:4 diisocyanate or toluene 2:6 diisocyanate, or a mixture thereof, dicyclohexylmethane diisocyanate, bis-isocyanatomethyl durene, xylylene diisocyanate and the diisocyanate having the general structure

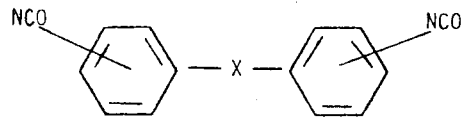

where X is a direct linkage or a divalent group, e.g. $-(CH_2)_n-$, where n is 1 to 3, -O-, -SO$_2$-. A diisocyanate of the above structure which is suitable on account of availability and the properties of the products derived therefrom is 4:4'-diphenylmethane diisocyanate. A suitable isocyanate having a functionality of greater than two is that sold as Suprasec DN by ICI Limited and comprising a mixture of 4:4'-diphenylmethane diisocyanate and isocyanates of higher functionality.

Compounds, e.g. adducts of isocyanates with alcohols, which may be decomposed to yield polyisocyanates may also be used as the cross-linking agent.

The vinyl monomer from which the vinyl polymer may be derived may be, for example, a vinyl ester, an aryl vinyl compound, a vinyl nitrile or a vinyl halide. If desired the vinyl polymer may be derived from a plurality of vinyl monomers. Suitable vinyl esters include, for example, vinyl acetate and esters of acrylic acid having the formula $CH_2 = CH - COOR$, where R is an alkyl, aryl, alkaryl, aralkyl or cycloalkyl group, e.g. methyl acrylate, ethylacrylate and n- and iso-propyl acrylates. Other vinyl esters include those of the formula $CH_2 = C(R')COOR$ where R' may be an alkyl, aryl, alkaryl, aralkyl or cycloalkyl group, and is preferably methyl, and in which R and R' may be the same or different, for example, methyl methacrylate, ethyl methacrylate, n- and iso-propyl methacrylate.

The aromatic vinyl compound may be, for example, styrene or an α-alkyl derivative thereof, e.g. α-methyl styrene, or e.g. vinyl naphthalene.

Suitable vinyl nitriles include, for example acrylonitrile and derivatives thereof, e.g. methacrylonitrile, and the vinyl halide may be for example, vinyl chloride or vinyl bromide.

According to a further embodiment of our invention we provide a process for the production of a shaped polymeric article which comprises reacting a fluid mixture of from 1% to 60% by weight of the precursors of a cross-linked polymeric material comprising at least one polymer having a Tg of not more than 25°C, at least 80% by weight of the polymer having a molecular weight of at least 3,000, and at least one cross-linking agent reactive therewith, and from 99% to 40% by weight of at least one vinyl monomer to produce an article of a cross-linked polymer having a Tg of not more than 25°C and a vinyl polymer and shaping the mixture while it is still fluid, the precursors of the cross-linked polymeric material being soluble in or dispersed in the vinyl monomer, and in which the reaction of the polymer with the cross-linking agent is substantially completed before polymerisation of the vinyl monomer is allowed to proceed to the extent that the vinyl polymer so produced forms a separate phase.

The cross-linking agent, which reacts with the polymer to produce the cross-linked polymeric material should not, under the conditions of the cross-linking reaction, also react with the vinyl monomer nor should it polymerise the vinyl monomer during the cross-linking reaction to an extent such as to produce an amount of vinyl polymer which forms a separate phase. Under the conditions of the cross-linking reaction the vinyl monomer should not react with the polymer from which the cross-linked polymeric material is produced.

Where clear, transparent shaped articles are desired it is preferred that the precursors of the cross-linked polymeric material and the vinyl monomer form a homogeneous mixture, that is, a mixture in which the precursors are soluble in the vinyl monomer, or at least in which the precursors are dispersed in the vinyl monomer so as not to produce gross phase separation visible to the naked eye, although we do not exclude the possibility of a slight haziness in the mixture.

As hereinbefore discussed, it is preferred that the precursors of the cross-linked polymeric material consist of at least one polymer having a molecular weight of at least 3,000 and a Tg of not more than 25°C and at least one cross-linking agent reactive therewith.

If a substantial amount of vinyl polymer is formed before reaction of the precursors of the cross-linked polymeric material is substantially completed the vinyl polymer so produced may form a visibly separate phase and in an extreme case may separate into a visibly distinct layer. The articles so produced will be of low strength and hazy or even opaque.

In order that the possibility of phase separation due to formation of vinyl polymer during reaction of the precursors of the cross-linked polymeric material may be decreased it is preferred that the reaction of the cross-linked polymeric material be effected as rapidly as possible. Catalysts which increase the rate of reaction may be used. For example, where the cross-linked polymeric material is a cross-linked polyurethane suitable catalysts include tertiary amines or stannous octoate, and particularly dibutyl tin dilaurate. If desired suitable inhibitors, e.g. quinones, may be used to delay the onset of the polymerisation of the vinyl monomer.

The vinyl monomer may be polymerised in the presence of suitable catalysts, for example, free-radical generators, e.g. peroxides and azobisisobutyronitrile.

Where the cross-linked polymeric material is a polyurethane we have found that the process of the present invention offers substantial advantages over the process described in the aforementioned British Patent Specification No. 1,239,701. Thus we have found that where the precursors comprise at least one polymer containing a plurality of groups reactive with isocyanate groups and having a molecular weight of at least 3,000 and a polyisocyanate reactive therewith to cross-link the polymer the times required to react the polymer and the polyisocyanate may be very short, e.g. in some case of the order of 5 to 15 minutes after which time the vinyl monomer may be polymerised, although longer times may be used if desired. On the other hand, in the process described in the aforementioned specification where the cross-linked polyurethane is formed from precursors of lower molecular weight than those described in the present invention the time required to form the polyurethane by effecting the cross-linking reaction is much longer under the same conditions of catalyst concentration and temperature, and may be as long as 5 to 15 hours or longer before the vinyl monomer may be polymerised. This is clearly of advantage where care must be exercised to ensure that little if any polymerisation of the vinyl monomer takes place during the cross-linking reaction as the longer the time required to effect the cross-linking reaction, the greater is the danger that an unacceptable amount of polymerisation of the vinyl monomer will take place during the cross-linking reaction.

where the cross-linked polymeric material is a polyurethane the nature of and concentration of the catalysts and inhibitors in the mixture to be reacted may generally be arranged so that gelation of the polyurethane is effected at or near ambient temperature and the polymerisation of the vinyl monomer may be effected at a higher temperature, although we have found in some cases that the gelation of the polyurethane precursors proceeds so rapidly that the mixture of the precursors and the vinyl monomer may be heated directly to the temperature of polymerisation of the vinyl monomer without the vinyl polymer so produced forming a visibly separate phase, the cross-linking reaction being effected so rapidly that little if any vinyl polymer is formed during the cross-linking reaction.

The shaped articles may be produced, for example, by charging the mixture of cross-linked polymeric material precursors and vinyl momomer to a suitably shaped mould, e.g. so as to produce a sheet, and effecting the reaction. Desirably, the molecular weight of the polymer in the precursors of the cross-linked polymeric material and the amount of the polymer is not so great as to produce a mixture which is so viscous that it cannot be readily charged to a mould.

The shaped article of our invention comprises a cross-linked polymeric material and a vinyl polymer and we have found that for a given proportion of cross-linked polymer to vinyl polymer in the article the properties of the article are dependent on the density of cross-links in the cross-linked polymeric material. The density of cross-linking is governed by the proportion of sites on the polymers which are capable of reacting with the cross-linking agent to cross-linking agent. For example, we have found that as the degree of cross-linking in the cross-linked polymeric material increases the level of certain properties may increase and the level of other properties may decrease. Thus, we have found that for an article containing a given proportion of polyurethane and poly(methyl methacrylate) the flexural properties of the article increase with increase in the degree of cross-linking of the polymeric material whereas at the same time the impact strength of the article increases, reaches a maximum value, and then decreases with increase in the degree of cross-linking.

The relative proportion of the polymer and the cross-linking agent in the precursors of the cross-linked polymeric material should be chosen so as to produce an article having the desired properties, and in particular the desired combination of properties. It is possible to give some general guidlines regarding selection of suitable proportions of polymer to cross-linking agent although the desired proportions may be selected by means of simple experiment and by reference to the Examples set out at the end of this specification.

Thus, the amount of cross-linking agent by weight of polymer which must be reacted with the polymer to give a cross-linked polymer of a given cross-link density will decrease with increase in the molecular weight of the polymer.

Also, to achieve a given cross-link density with polymers having the same molecular weight but different proportions of groups in the polymer which are reactive with the cross-linking agent substantially the same weight of cross-linking agent will be needed per unit weight of each of the polymers, and thus the proportion of cross-linking agent to groups in the polymer reactive with cross-linking agent which need be used will decrease with increase in the proportion of groups in the polymer reactive with cross-linking agent.

The shaped articles of our invention may also be subjected to a further shaping process and according to a further embodiment of our invention we provide a method of forming a shaped polymeric article of complex profile which comprises performing a further shaping operation on a shaped polymeric article of our invention which is of simple profile and which is in a heat-softened state, and thereafter causing or allowing the thus further shaped article to cool to a temperature below that at which it is in a heat-softened state. Suitable methods of effecting further shaping include vacuum forming and blow-moulding and causing the shaped article at simple profile to conform to the contours of a mould, e.g. by compression moulding. Suitably, the shaped article of simple profile may be in the form of a sheet.

If desired, the impact strengths of the shaped articles of our invention may be improved by incorporating fibrous reinforcement into the articles during the production of the articles, for example, glass fibre in the form of e.g. strands, mats or chopped rovings; carbon or asbestos fibre; or fibres of high molecular weight organic materials, e.g. polyamides or polyesters.

Other reinforcing agents, e.g. particulate reinforcing materials, may be incorporated into the shaped articles, together with colouring agents and stabilisers well-known in the art, e.g. antioxidants, antiozonants and u.v. stabilisers.

The shaped articles of our invention may be used for example, as windows and in particular may be used as vandalresistant protection windows.

The invention is illustrated by the following Examples in which all parts are expressed as parts by weight.

Flexural moduli and flexural strengths in Examples 1 to 9 were measured on a Hounsfield Tensometer using specimens of dimensions 3 in. × ½ in. × ⅛ in. with a cross-head speed of 0.05 in. min$^{-1}$ and a 2 in. span.

In the remaining Examples flexural moduli and flexural strengths were measured following the procedure of ASTM D790-66 using a strain rate of 0.1 mm/mm min.

Impact strengths were measured on a Hounsfield impact machine on unnotched samples of dimensions 2 in. × ¼ in. × ⅛ in. Notched impact strengths were measured on samples of similar dimensions having a ⅛ in. deep notched cut in the 2 in. side. The notch radius was either 0.01 in. or 0.08 in.

Falling dart impact strengths were measured following the procedure of BS 2782/3/306B with the exception that in Examples 1 to 9 only, the weight was dropped from a height of 3 ft. instead of 2 ft.

Tensile strengths and elongation to break were measured following the procedure of ASTM D638.

Heat distortion temperatures were measured following the procedure described in ASTM D648/56.

Number average molecular weight were measured using vapour pressure osmometry with carbon tetrachloride as solvent.

Rockwell hardness was measured following the procedure described in ASTM D785-65.

Vicat softening points were measured on a Davenport Vicat softening machine usng samples of dimensions ¾ in. × ¾ in. × ⅛ in.

EXAMPLE 1

99 Parts of butyl acrylate and 1 part of hydroxyethyl methacrylate were introduced into a vessel fitted with a stirrer and a nitrogen inlet and outlet. 400 Parts of ethyl acetate containing 0.4 part of azobisisobutyronitrile were then introduced into the vessel and the contents of the vessel were heated at 50°C for 6 hours with stirring. The resultant viscous solution was poured into a mixture of methanol and water and the polymer which was precipitated was filtered and dried at 60°C in a vacuum oven.

The resultant butyl acrylate/hydroxyethyl methacrylate copolymer had a number average molecular weight of 7,000 and a glass-rubber transition temperature of less than 25°C.

26 Parts of the copolymer prepared above were charged to a flask and 144 parts of methyl methacrylate and 0.3 part of hexamethylene diisocyanate were added to the flask to form a homogeneous mixture. 0.1 Part of dibutyl tin dilaurate and 0.3 part of azobisisobutyronitrile were added to the mixture which was then degassed by connecting the flask to a source of vacuum. The mixture was then poured into the cavity of a mould formed by placing a ⅛ in. deep neoprene rubber gasket of dimensions 6 in. × 6 in. × ½ in. wide on a flat ⅛ in. deep glass plate. A similar glass plate was plated over the open face of the mould and the plates were held together by spring clips.

The mould was allowed to stand at room temperature for 8 hours during which time the copolymer was cross-linked by reaction with the hexamethylene diisocyanate, and was then heated in an oven at 50°C for 18 hours, 90°C for 1 hour and 130°C for 2 hours.

The mould was removed from the oven, allowed to cool and a sheet was removed from the mould.

The sheet, which contained 15.3% by weight of cross-linked polymer and 84.7% by weight of poly(-methyl methacrylate) and in which the cross-linked polymer had a glass-rubber transition temperature of less than 0°C, had the following properties:

| | |
|---|---|
| Flexural modulus | 14,200 Kg.cm$^{-2}$ |
| Flexural yield strength | 400 Kg.cm$^{-2}$ |
| Notched impact strength (0.01 in. notch) | 3.5 Kg.cm.cm$^{-2}$ |
| Unnotched impact strength | 44.5 Kg.cm.cm$^{-2}$ |

By way of comparison, and in order to show the effect of omitting to cross-link the copolymer, the above procedure was repeated except that the mixture charged to the mould contained 26 parts of the butyl acrylate/hydroxyethyl methacrylate copolymer, 144 parts of methyl methacrylate and 0.3 part of azobisisobutyronitrile, that is, the hexamethylene diisocyanate and dibutyl tin dilaurate were omitted. The mixtue was heated in a mould following the above procedure and the resultant polymer sheet removed from the mould. The polymer sheet was tacky and unsuitable for test.

EXAMPLE 2

The procedure of Example 1 was repeated except that the mixture contained 20 parts of the butyl acrylate/hydroxyethyl methacrylate copolymer of Example 1, 175 parts of methyl methacrylate, 0.3 part of azobisisobutyronitrile, 0.1 part of dibutyl tin dilaurate and 0.2 part of hexamethylene diisocyanate.

The degassed mixture charged to the mould was heated at 50°C for 24 hours, 90°C for 1 hour and 120°C for 2 hours.

The sheet removed from the mould and which contained 10.2% by weight of cross-linked polymer having a Tg of less than 0°C and 89.8% by weight of poly(-methyl methacrylate) had the following properties.

| | |
|---|---|
| Flexural modulus | 19,000 Kg.cm$^{-2}$ |
| Flexural yield strength | 600 Kg.cm$^{-2}$ |

| | |
|---|---|
| Notched impact strength (0.01 in. notch) | 4 Kg.cm.cm$^{-2}$ |
| Unnotched impact strength | 47 Kg.cm.cm$^{-2}$ |
| Falling dart impact strength | 2.4–3.0 ft. lb. |

EXAMPLE 3

A copolymer of butyl acrylate and hydroxyethyl methacrylate having a Tg of less than 25°C was prepared following the procedure of Example 1 except that 95 parts of butyl acrylate and 5 parts of hydroxy ethyl methacrylate were used and the copolymerisation was effected for 12 hours at 50°C in 200 parts of ethyl acetate and in the presence of 0.05 part of azobisisobutyronitrile. The resultant copolymer had a number average molecular weight of 20,600 ± 12%.

30 Parts of the copolymer prepared as described aove were dissolved in 170 parts of methyl methacrylate containing 0.05 part of azobisisobutyronitrile, 0.1 part of t-butylperbenzoate and 0.1 part of dibutyl tin dilaurate. 0.35 Part of 4:4'-diphenyl methane diisocyanate was then dissolved in the mixture which was then degassed and charged to a mould as used in Example 1.

After standing for 20 minutes at room temperature the mould was heated 70°C for 18 hours, 90°C for 1 hour and 110°C for 2 hours.

The sheet removed from the mould and which contained 15% by weight of cross-linked polymer having a Tg less than 0°C and 85% by weight of poly(methyl methacrylate) had the following properties:

| | |
|---|---|
| Flexural modulus | 15,800 Kg.cm$^{-2}$ |
| Flexural yield strength | 490 Kg.cm$^{-2}$ |
| Notched impact strength (0.01 in. notch) | 4.5 Kg.cm.cm$^{-2}$ |
| Unnotched impact strength | 54.5 Kg.cm.cm$^{-2}$ |

In a further experiment the above procedure was repeated except that the 4:4'-diphenyl methane diisocyanate was replaced by 0.25 part of hexamethylene diisocyanate and the mixture charged to the mould was allowed to stand at room temperature for 1½ hours before heating in an oven.

The sheet removed from the mould had the following properties:

| | |
|---|---|
| Flexural modulus | 14,900 Kg.cm$^{-2}$ |
| Flexural yield strength | 453 Kg.cm$^{-2}$ |
| Notched impact strength (0.01 in. notch) | 4.1 Kg.cm.cm$^{-2}$ |
| Unnotched impact strength | 52 Kg.cm.cm$^{-2}$ |

By way of comparison the above procedure was repeated except that the hexamethylene diisocyanate was omitted. The resultant polymer sheet was tacky and unsuitable for test.

EXAMPLE 4

20 Parts of 73:14:13 weight % ethylene/methyl methacrylate/hydroxy ethyl methacrylate copolymer having a Tg of −15°C and a number average molecular weight of 17,000 were dissolved in 110 parts of methyl methacrylate at approximately 90°C. The resultant solution was allowed to cool to 70°C and a solution of 0.1 part of azobisisobutyronitrile, 0.1 part of t-butylperbenzoate, 0.2 part of hexamethylene diisocyanate and 0.1 part of dibutyl tin dilaurate in 10 parts of methyl of methacrylate was added.

The resultant mixture was degassed and charged to a mould as used in Example 1 which had previously been heated to a temperature of 80°C and the mould was then heated at 70°C for 18 hours, 1 hour at 90°C and 2 hours at 110°C The sheet removed from the mould and which contained 14.3% by weight of cross-linked polymer having a Tg of −10°C and 85.7% by weight of poly(methyl methacrylate) had a falling dart impact strength of 1.6 to 2 ft. lb.

By way of comparison a commercially available poly(methyl; methacrylate) sheet had a falling dart impact strength of less than 0.8 ft. lb.

EXAMPLE 5

20 Parts of the ethylene/methyl methacrylate/hydroxyethyl methacrylate copolymer as used in Example 4 were dissolved in 110 parts of methyl methacrylate at a temperature of approximately 80°C.

To the resultant solution there was then added the product of reaction of 0.1 part of hydroxyethyl methacrylate and 0.2 part of hexamethylene diisocyanate which had been reacted until an infra-red spectrum indicated the absence of hydroxyl groups, followed by a solution of 0.05 part of azobisisobutyronitrile, 0.1 part of t-butylperbenzoate and 0.1 part of dibutyl tin dilaurate.

The mixture was degassed, charged to a mould as used in Example 1 and heated at 60°C for 18 hours, 90°C for 1 hour and 110°C for 2 hours.

The sheet removed from the mould which contained 15.6% by weight of cross-linked polymer having a Tg of −10°C and 84.4% by weight of poly(methyl methacrylate) had the following properties:

| | |
|---|---|
| Flexural modulus | 18,460 Kg.cm.cm$^{-2}$ |
| Flexural yield strength | 600 Kg.cm.cm$^{-2}$ |
| Falling dart impact strength | 3 to 4 ft. lb. |

EXAMPLE 6

The procedure of Example 4 was repeated except that 7 parts of the ethylene/methyl methacrylate/hydroxyethyl-methacrylate copolymer as used in Example 4, 0.08 part of azobisisobutyronitrile and 0.1 part of hexamethylene diisocyanate were used, and the mixture was charged to a mould as used in Example 1 which had previously been heated to a temperature of 60°C and the mould was heated at 60°C for 18 hours, 90°C for 1 hour and 110°C for 2 hours.

The resultant clear and transparent sheet which contained 5.5% by weight of a cross-linked polymer having a Tg of −10°C and 94.5% by weight of poly(methyl methacrylate) had the following properties:

| | |
|---|---|
| Flexural modulus | 25,390 Kg.cm$^{-2}$ |
| Flexural yield strength | 830 Kg.cm$^{-2}$ |
| Notched impact strength (0.01 in. notch) | 4 Kg.cm.cm.$^{-2}$ |
| Falling dart impact strength | 2 ft. lb. |
| Heat distortion temperature (ASTM D648/56 at 264 lb. sq.in$^{-1}$) | 96°C |

EXAMPLE 7

15 Parts of a 60:35:5 ethylene/ethyl acrylate/hydroxyethyl methacrylate copolymer having a Tg of −35°C and a number average molecular weight of 18,000 were dissolved at 60°C in 130 parts of methyl methacrylate and to the resultant solution 0.02 part of dibutyl tin dilaurate and 0.1 part of hexamethylene diisocyanate were added.

The solution was heated at 65°C for 3 1/2 hours during which time the solution became progressively thicker.

A solution of 0.15 part of azobisisobutyronitrile in 5 parts of methyl methacrylate was then added and the resultant mixture was degassed and charged to a mould as used in Example 1 which had previously been heated to a temperature of 60°C.

The mould was heated in an oven at 60°C for 18 hours, 90°C for 1 hour and 110°C for 2 hours and the sheet removed from the mould which contained 10% by weight of cross-linked polymer having a Tg of −30°C and 90% by weight of poly(methyl methacrylate) had the following properties.

| | |
|---|---|
| Flexural modulus | 16,000 Kg.cm$^{-2}$ |
| Flexural yield strength | 465 Kg.cm$^{-2}$ |
| Notched impact strength (0.01 in. notch) | 5.5 Kg.cm.cm$^{-2}$ |
| Unnotched impact strength | 45 Kg.cm.cm$^{-2}$ |
| Heat distortion temperature (ASTM D648/56 at 264 lb.sq.in.$^{-1}$) | 81 °C |

The above procedure was repeated ecept that the mixture charged to the mould was heated initially at a temperature of 50°C.

The sheet had the following properties:

| | |
|---|---|
| Flexural modulus | 17,500 Kg.cm$^{-2}$ |
| Flexural yield strength | 535 Kg.cm$^{-2}$ |
| Notched impact strength (0.01 in. notch) | 6.0 Kg.cm.cm$^{-2}$ |
| Unnotched impact strength | 53 Kg.cm.cm$^{-2}$ |
| Heat distortion temperature (ASTM D648/56 at 264 lb.sq.in$^{-1}$) | 89 °C |

EXAMPLE 8

18 Parts of a copolymer as used in Example 7 were dissolved in 162 parts of methyl methacrylate at 50°C and 0.2 part of 4:4'-diphenylmethane diisocyanate and 0.03 part of dibutyl tin dilaurate were added followed by 0.2 part of azobisisobutyronitrile.

The resultant mixture was degassed and charged to a mould following the procedure of Example 1 and heated at 50°C for 18 hours, 90°C for 1 hour and 110°C for 2 hours.

The sheet removed from the mould which contained 10% by weight of cross-linked polymer having a Tg of −30°C and 90% by weight of poly(methyl methacrylate) had the following properties:

| | |
|---|---|
| Flexural modulus | 18,000 Kg.cm$^{-2}$ |
| Flexural yield strength | 523 Kg.cm$^{-2}$ |
| Notched impact strength (0.01 in. notch) | 6 Kg.cm.cm$^{-2}$ |
| Unnotched impact strength | 71 Kg.cm.cm$^{-2}$ |
| Heat distortion temperature (ASTM D648/56 at 264 lb.sq.in.$^{-1}$) | 93 °C |

EXAMPLE 9

The procedure of Example 8 was followed except that the 4:4'-diphenylmethane diisocyanate was replaced by 0.25 part of bisisocyanto methyl durene and the mixture was stirred at 50°C for 2¾ hours before addition of the azobisisobutyronitrile. After addition of the latter the mixture was degassed and charged to a mould and the mould was heated following the procedure of Example 8.

The resultant polymer sheet had the falling dart impact strength of 2 to 3 ft. lb.

EXAMPLE 10

30 Parts of an ethylene/methylmethacrylate/hydroxyethyl methacrylate copolymer as used in Example 4 were dissolved in 170 parts of methyl methacrylate (containing 100 parts per million of hydroquinone) at 60°C. To this solution at 60°C there was added 0.2 part of Tinuvin P (an ultra-violet stabiliser supplied by Geigy), 0.4 part of Stanclere 186 (an organo tin compound supplied by Pure Chemicals Ltd.), 0.4 part of Irganox 1076 (an antioxidant supplied by Geigy), and 0.4 part dilaurylthiodipropionate. 1 Part of hexamethylene diisocyanate and 0.1 part of azobisisobutyronitrile were added to the solution which was then degassed and charged to a mould as used in Example 1, the mould having previously been preheated to 60°C.

After standing for 20 minutes at 60°C cross-linking of the copolymer by reaction with the hexamethylene diisocyanate had proceeded to the extent that after 20 minutes there was no further increase in viscosity on visual examination.

After standing for a further 2 to 2½ hours at 60°C the viscosity of the solution increased further due to the onset of polymerisation of the methyl methacrylate. The mould and contents were then heated at 115°C for a further 1 hour in order to complete the polymerisation of the methyl methacrylate.

The mould was allowed to cool and the clear, transparent sheet, which contained 15% by weight of cross-linked polymer having a Tg of −10°C and 85% by weight of poly(methyl methacrylate), was removed from the mould. The sheet had the following properties. For comparison the properties of a sheet of poly(-methyl methacrylate) are also given.

| Property | Units | Sheet containing 15 by weight cross-linked polymer | Poly(methyl methacrylate) |
|---|---|---|---|
| Notched impact strength (0.01 in. notch) | KJm$^{-2}$ | 8.3 | 1.1 |
| Notched impact strength (0.08 in. notch) | KJm$^{-2}$ | 21 | 3.5 |
| Unnotched impact strength | KJm$^{-2}$ | >130 | 16 |
| Falling Dart impact Strength | J | 7 | 0.3–0.7 |
| Flexural modulus | GNm$^{-2}$ | 1.82 | 3.3 |
| Flexural strength | MNm$^{-2}$ | 68 | 128 |
| Tensile strength | MNm$^{-2}$ | 40.3 | 86 |
| Elongation to break | % | — | 3–4 |

| Property | Units | Sheet containing 15 by weight cross-linked polymer | Poly(methyl methacrylate) |
|---|---|---|---|
| Rockwell Hardness | | M 58 | M 109 |

The above procedure was repeated in two further experiments except the solution charged to the moulds was allowed to stand at 70°C and 80°C respectively.

In each case the cross-linking of the copolymer was allowed to proceed for 10 minutes after which time there was no further increase in viscosity on visual examination. After allowing the moulds to stand at 70°C and 80°C for a further 1½ hours and ¾ hour respectively polymerisation of the methyl methacrylate commenced and thereafter polymerisation was completed by heating at 115°C for 1 hour. The sheets removed from the moulds possessed properties substantially similar to those given above.

EXAMPLE 11

The procedure of Example 10 was repeated except that 20 parts of the ethylene/methyl methacrylate/hydroxyethyl methacrylate copolymer, 180 parts of methyl methacrylate (containing 100 parts per million of hydroquinone) and 0.7 part of hexamethylene diisocyanate were used, and the mould and contents were allowed to stand at 70°C.

The cross-linking of the copolymer had proceeded to the extent that after 5 minutes there was no further increase in viscosity on visual examination. After standing for 1½ hours polymerisation of methyl methacrylate commenced. Polymerization was completed by heating the mould at 115°C for 2 hours.

The clear, transparent sheet removed from the mould, which contained 10% by weight of cross-linked polymer having a Tg of −10°C and 90% by weight of poly(methyl methacrylate), had the following properties:

| Property | Units | |
|---|---|---|
| Notched impact strength (0.01 in. notch) | KJm$^{-2}$ | 5.9 |
| Notched impact strength (0.08 in. notch) | KJm$^{-2}$ | 12.5 |
| Unnotched impact strength | KJm$^{-2}$ | 70 |
| Falling Dart Impact Strength | J | 4–5 |
| Flexural modulus | GNm$^{-2}$ | 2.25 |
| Flexural strength | MNm$^{-2}$ | 93 |
| Tensile strength | MNm$^{-2}$ | 56 |
| Elongation to break | % | 60 |
| Rockwell Hardness | | M 83 |
| 1/10 Vicat Softening Point | °C | 108 |
| 10/10 Vicat Softening Point | °C | 114 |
| Heat distortion temperature | | |
| 66 lb/sq.in | °C | 106 |
| 264 lb/sq.in | °C | 96 |

In a comparative experiment the above procedure was repeated except the methyl methacrylate was free of hydroquinone inhibitor and only 0.1 part of Stanclere 186 was used.

After standing in the mould at 70°C for minutes the crosslinking of the copolymer proceeded. However, polymerisation of the methyl methacrylate had already commenced and the sheet removed from the mould after heating for 2 hours at 115°C was hazy rather than clear and transparent. The sheet had the following properties.

| | | |
|---|---|---|
| Notched impact strength (0.01 in. notch) | 3.1 | KJm$^{-2}$ |
| Flexural modulus | 1.41 | GNm$^{-2}$ |
| Flexural strength | 45 | MNm$^{-2}$ |
| Heat distortion temperature 264 lb/sq.in | 72°C | |

In a further experiment the above procedure was repeated except that the hexamethylene diisocyanate was omitted and thus the copolymer in the resultant sheet was thus not cross-linked.

The sheet was hazy and unsuitable for test.

EXAMPLE 12

The procedure of Example 10 was repeated except that 10 parts of copolymer, 190 parts of methyl methacrylate (containing 100 parts per million of hydroquinone), 0.2 part of dilaurylthiodipropionate and 0.35 part of hexamethylene diisocyanate were used, and the azobisisobutyronitrile was added to the solution after the solution had been allowed to stand at 60°C for 45 minutes during which time some cross-linking of the copolymer occurs. The solution was then degassed and charged to a mould at 60°C as used in Example 1 and after 20 minutes the cross-linking reaction had proceeded to the extent that there was no further increase in viscosity on visual examination.

Thereafter the mould was heated at 115°C for 2 hours to polymerise the vinyl monomer.

The sheet removed from the mould, which contained 5% by weight of a cross-linked polymer having a Tg of −10°C and 95% by weight of poly(methyl methacrylate) had the following properties.

| | | |
|---|---|---|
| Notched impact strength (0.01 in. notch) | 4.2 | KJm$^{-2}$ |
| Notched impact strength (0.08 in. notch) | 9.6 | KJm$^{-2}$ |
| Unnotched impact strength | 39 | KJm$^{-2}$ |
| Falling Dart Impact strength | 3.5 | J |
| Flexural modulus | 2.7 | GNm$^{-2}$ |
| Flexural strength | 101 | MNm$^{-2}$ |
| Tensile strength | 66 | MNm$^{-2}$ |
| Elongation to break | 30% | |
| Rockwell Hardness | M 90 | |
| 1/10 Vicat Softening Point | 108°C | |
| 10/10 Vicat Softening Point | 116°C | |
| Heat distortion temperature 264 lb/sq.in. | 99°C | |

By way of comparison and in order to illustrate the effect of simultaneously cross-linking the copolymer and polymerising the methyl methacrylate the above procedure was repeated except that the methyl methacrylate was was free of inhibitor and the azobisisobutyronitrile was added to the solution immediately after the addition of the hexamethylene diisocyanate and the solution was then degassed and charged to a mould as used in Example 1. After heating at 60°C for 18 hours the mould was heated at 115°C for 2 hours. The sheet removed from the mould was cloudy and showed gross phase separation and was unsuitable for test.

EXAMPLE 13

The procedure of Example 10 was repeated except that 5 parts of copolymer, 195 parts of methyl methacrylate (containing 100 parts per million of hydroquinone), 0.2 part of dilaurylthiodipropionate and 0.2 part of hexamethylene diisocyanate were used and the azobisisobutyronitrile was added to the solution after the solution had been allowed to stand at 60°C for 2 hours during which time some cross-linking of the copolymer occurs. The solution was then degassed and charged to a mould at 60°C as used in Example 1 and after 20 minutes cross-linking was substantially complete. The mould was allowed to stand at 60°C for a further 18 hours and was then heated at 115°C for 2 hours.

The sheet removed from the mould, which contained 2½% by weight of a cross-linked polymer having a Tg of −10°C and 97.5% by weight of poly(methyl methacrylate) had the following properties:

| | |
|---|---|
| Notched impact strength (0.01 in. notch) | 2.8 KJm$^{-2}$ |
| Notched impact strength (0.08 in. notch) | 7 KJm$^{-2}$ |
| Unnotched impact strength | 26 KJm$^{-2}$ |
| Falling Dart Impact Strength | 2 J |
| Flexural modulus | 3.0 GNm$^{-2}$ |
| Flexural strength | 123 MNm$^{-2}$ |
| Tensile strength | 71 MNm$^{-2}$ |
| Elongation to break | 7% |
| Rockwell Hardness | M 104 |
| 1/10 Vicat Softening Point | 109°C |
| 10/10 Vicat Softening Point | 117°C |
| Heat distortion temperature | 99°C |

EXAMPLE 14

In five separate experiments, experiments A to E, the procedure of Example 10 was repeated except that 20 parts of copolymer, and 180 parts of methyl methacrylate (containing 100 parts per million of hydroquinone) and 0.08 part of azobisisobutyronitrile, were used, and in the separate experiments the following amounts of hexamethylene diisocyanate were used. A 0.134 part, B 0.4 part, C 0.66 part, D 0.94 part, E 1.38 part.

Each solution was degassed and charged to a mould as used in Example 1 and the moulds were allowed to stand at 60°C for 17 hours and were then heated at 115°C for 2 hours. The sheets removed from the moulds, which each contained 10% by weight of a cross-linked polymer having Tg of −10°C and 90% by weight of poly(methyl methacrylate) had the following properties.

| Experiment | A | B | C | D | E |
|---|---|---|---|---|---|
| Flexural modulus GNm$^{-2}$ | 1.28 | 1.65 | 2.08 | 2.26 | 2.37 |
| Flexural strength MNm$^{-2}$ | 35.7 | 58.2 | 70.5 | 85.5 | 89.9 |
| Notched impact strength (0.01 in. notch) KJm$^{-2}$ | 5.4 | 6.3 | 7.0 | 5.2 | 3.1 |

These experiments illustrate the effect on properties of the sheet of variation of the relative proportion of copolymer to cross-linking agent used in the production of the cross-linked polymer.

EXAMPLE 15

In three separate experiments, A, B and C, the procedure of Example 10 was repeated except that 50 parts of copolymer, 450 parts of methyl methacrylate (containing 100 parts per million of hydroquinone), 0.2 part of Stanclere 186, 0.5 part of Tinuvin P, and 0.4 part of Irganox 1076, and 0.2 part of azobisisobutyronitrile were used, and in the separate experiments the hexamethylene diisocyanate used in Example 10 was replaced by a reaction product of hexamethylene diisocyanate and hydroxyethyl methacrylate reacted in the presence of 0.01 part Stanclere 55 an organo tin compound (supplied by Pure Chemicals Ltd). In experiments A, B and C the said reaction product was formed by reacting 1.8 parts, 2.3 parts and 4.0 parts respectively of hexamethylene diisocyanate with 0.2 part, 0.5 part and 0.75 part respectively of hydroxyethyl methacrylate.

Each solution was degassed and charged to a mould as used in Example 1 and the moulds were allowed to stand at 60°C for 18 hours and were then heated at 115°C for 2 hours. The sheets removed from the moulds, which each contained 10% by weight of a cross-linked polymer having a Tg of −5°C and 90% by weight of poly(methyl methacrylate) had the following properties:

| Experiment | A | B | C |
|---|---|---|---|
| Notched impact strength (0.01 in. notch) KJm$^{-2}$ | 4.8 | 4.4 | 2.0 |
| Flexural modulus GNm$^{-2}$ | 2.35 | 2.3 | 2.4 |
| Flexural strength MNm$^{-2}$ | 86.7 | 86 | 93.6 |

EXAMPLE 16

The procedure of Example 10 was repeated in three separate experiments A, B and C except that 20 parts of copolymer and 0.7 part of hexamethylene diisocyanate were used, the Tinuvin P Stanclere 186, dilaurylthiodipropionate, and Irganox 1076 were omitted, and 0.4 part of Stanclere 55 were used. In Experiments A and B, 0.4 part of tertiary butyl peroctoate were used in place of the azobisisobutyronitrile and, in place of the methyl methacrylate used in Example 10 there was used in Experiment A, 72 parts of styrene and 108 parts of methyl methacrylate (containing 100 parts per million of hydroquinone), in Experiment B 180 parts of styrne (inhibitor free), and in Experiment C 160 parts of methyl methacrylate (containing 100 parts per million of hydroquinone) and 20 parts of acrylonitrile.

The solutions were degassed and charged to separate moulds as used in Example 1 at 60°C and allowed to stand at this temperature for 18 hours and were finally heated at 115°C for 2 hours.

The sheets removed from the moulds which each contained 10% by weight of a cross-linked polymer having a Tg of −10°C and 90% by weight of, respectively, a copolymer of styrene and methyl methacrylate (Experiment A), polystyrene (Experiment B), and a copolymer of methyl methacrylate and acrylonitrile (Experiment C) had the following properties:

| Experiment | A | B | C |
|---|---|---|---|
| Notched impact strength (0.01 in. Notch) KJm$^{-2}$ | 9.5 | 3.3 | 5.0 |
| Flexural modulus GNm$^{-2}$ | 1.91 | 2.3 | 2.3 |
| Flexural strength MNm$^{-2}$ | 72 | 80 | 79.8 |

By way of comparison the properties of sheets of a 40:60% by weight copolymer of styrene and methyl methacrylate (D), polystyrene (E), and an 11.1:89.9% by weight copolymer of acrylonitrile and methyl methacrylate were as follows:

| Experiment | D | E | F |
|---|---|---|---|
| Notched Impact strength (0.01 in. notch) KJm$^{-2}$ | 1.4 | 1.1 | 1.2 |
| Flexural modulus GNm$^{-2}$ | 3.2 | 3.1 | 3.4 |
| Flexural strength MNm$^{-2}$ | 1.0 | 100 | 110 |

EXAMPLE 17

The procedure of Example 10 was repeated except that 20 parts of copolymer, 180 parts of methyl methacrylate (containing 100 parts per million of hydroquinone), and 0.2 part of azobisisobutyronitrile and 0.7 part of hexamethylene diisocyanate were used and the Tinuvin P, Irganox 1076 and dilaurylthiodipropionate were omitted and 0.4 part of Stanclere 55 was used in place of the Stanclere 186.

The solution was degassed and charged to a mould as used in Example 1 at 70°C. After 15 minutes at this temperature reaction of the copolymer with hexamethylene diisocyanate had proceeded to the extent that there was no further increase in viscosity. Thereafter, the mould was heated at 115°C for 2 hours to polymerise the methyl methacrylate.

By way of comparison and in order to illustrate the effect of molecular weight on the time required to effect cross-linking a solution was made of 18 parts of poly(ethylene adipate) having a molecular weight of 1980, 0.8 part of trimethylol propane, 216 parts of methyl methacrylate (containing 100 parts per million of hydroquinone), 5.0 parts of hexamethylene diisocyanate and 0.5 part of Stanclere 55. The mixture was degassed and charged to a mould at 70°C as used in Example 1. Even after standing at 70°C for 3 hours the cross-linking reaction had not proceeded to completion. Thereafter, the mould was heated at 115°C for 2 hours to polymerise the methyl methacrylate.

By way of further comparison and to illustrate the effect of molecular weight on the amount of diisocyanate required to effect cross-linking 100 part of oxypropylated trimethylol propane having a molecular weight of 310 and 260 parts of 4:4'-diphenyl methane diisocyanate were mixed at 60°C and 1840 parts of methyl methacrylate were added. The solution was cooled to room temperature and 100 parts of oxypropylated trimethylol propane, 0.5 part of dibutyl tin dilaurate and 7.5 parts of azobisisobutyronitrile were added to the solution. The solution was degassed and charged to a mould as used in Example 1 and allowed to stand at room temperature for 2 hours in order to complete the cross-linking reaction. Thereafter, the methyl methacrylate was polymerised by heating the mould at 50°C for 16 hours and 115°C for 2 hours.

EXAMPLE 18

In four separate Experiments, Experiments A, B, C and D, the procedure of Example 10 was repeated except that the copolymer as used in Example 4 was replaced by the copolymer as used in Example 7 and the dilaurylthiodipropionate was omitted. The amounts of copolymers, methyl methacrylate (containing 100 parts per million of hydroquinone) and hexamethylene diisocyanate used were respectively in Experiment A 30 parts, 170 parts and 1 part, in Experiment B 20 parts, 180 parts and 0.7 part, in Experiment C 10 parts, 190 parts and 0.35 part, and in Experiment D 6 parts, 194 parts, and 0.2 part.

The solutions were allowed to stand at 60°C for respectively ¾ hour, 1¼ hours, 2½ hours and 3 hours, after which time 0.1 part of azobisisobutyronitrile was added to each solution.

The solutions were then degassed and charged to moulds as used in Example 1 at room temperature. The moulds were allowed to stand at room temperature for ½ hour and were then heated at 70°C for 18 hours and 115°C for 2 hours.

The clear, transparent sheets removed from the moulds which contained respectively 15%, 10%, 5% and 3% by weight of crosslinked polymer having a Tg of −30°C and, respectively 85%, 90% 95% and 97% by weight of poly(methyl methacrylate) had the following properties.

| Experiment | | A | B | C | D |
|---|---|---|---|---|---|
| Notched impact strength (0.01 in. notch) | KJm$^{-2}$ | 8.0 | 5.4 | 4.1 | 3.9 |
| Notched impact strength (0.08 in. notch) | KJm$^{-2}$ | 31 | 22 | 16 | 10 |
| Unnotched impact strength | KJm$^{-2}$ | >130 | >130 | 88 | 56 |
| Falling Dart Impact strength | J | 9 | 6.8 | 4.5 | 3.8 |
| Flexural modulus | GNm$^{-2}$ | 1.8 | 2.2 | 2.6 | 2.9 |
| Flexural strength | MNm$^{-2}$ | 65 | 84 | 99 | 114 |
| Tensile strength | MNm$^{-2}$ | 43 | 55 | 59 | 69 |
| Rockwell Hardness | | M 55 | M 80 | M 90 | M 99 |
| Heat Distortion Temperature (0.82 MNm$^{-2}$) | °C | 91 | 94 | 94 | 98 |

EXAMPLE 19

15 Parts of cis 1:4-polybutadiene having a number average molecular weight of 120,000 and a Tg of −95°C were dissolved in 135 parts of methyl methacrylate (containing 100 parts per million of Topanol-A free-radical inhibitor), 0.5 part of tertiary butyl hydroperoxide and 0.6 part of sulphur monochloride were added to the resulting solution and the solution was degassed and charged to a mould as used in Example 1 which had previously been heated to 80°C.

The polybutadiene was substantially cross-linked after ½ hour to a polymer having a Tg of −95°C and the mould was thereafter heated at 80°C for 18 hours and 115°C for 2 hours in order to polymerise the methyl methacrylate.

The transparent sheet, which contained 10% by weight of cross-linked polymer having a Tg of −90°C and 90% by weight of poly(methyl methacrylate) had the following properties:

| | |
|---|---|
| Notched impact strength (0.01 in. notch) | 8.8 KJm$^{-2}$ |
| Notched impact strength (0.08 in. notch) | 21 KJm$^{-2}$ |
| Unnotched impact strength | >130 KJm$^{-2}$ |
| Flexural modulus | 2.1 GNm$^{-2}$ |
| Flexural strength | 80 MNm$^{-2}$ |
| Heat Distortion Temperature (0.82 MNm$^{-2}$) | 93 °C |

By way of comparison and in order to illustrate the effect of omitting to cross-link the polybutadiene the sulphur monochloride was omitted. The sheet removed from the mould was tacky and brittle.

What we claim is:

1. A process for the preparation of a shaped polymeric article which comprises reacting a mixture consisting essentially of of (i) from 1% to 60% by weight of the precursors of a cross-linked polymeric material consisting essentially of at least one polymer having a Tg of not more than 25°C, a molecular weight of at least 3,000 and which contains hydroxyl groups and at least one polyisocyanate cross-linking agent, and (ii) from 99% to 40% by weight of at least one vinyl monomer which is free of groups which react with said hydroxylcontaining polymer or said polyisocyanate, to produce an article of a cross-linked polymeric material having a Tg of not more than 25°C and a vinyl polymer, and shaping the mixture while it is still fluid, the precursors of the cross-linked polymeric material being soluble in or dispersed in the vinyl monomer, and in which the reaction of the polymer with the cross-linking agent is substantially completed before polymerization of the vinyl monomer is allowed to proceed to the extent that the vinyl polymer so produced forms a separate phase.

2. A process as claimed in claim 1, in which the mixture comprises 2% to 30% by weight of the precursors of the cross-linked polymeric material and from 98% to 70% by weight of a vinyl monomer.

3. A process as claimed in claim 1, in which the mixture comprises from 5% to 30% by weight of the precursors of the cross-linked polymeric material and from 95% to 70% by weight of a vinyl monomer.

4. A process as claimed in claim 1, in which the mixture comprises from 10% to 20% by weight of the precursors of the cross-linked polymeric material and from 90% to 80% by weight of a vinyl monomer.

5. A process as claimed in claim 1, in which the Tg of the polymer from which the cross-linked polymeric material is formed is not more than 0°C.

6. A process as claimed in claim 1, in which the polymer from which the cross-linked polymeric material is formed has a molecular weight of at least 5,000.

7. A process as claimed in claim 6, in which the polymer from which the cross-linked polymeric material is formed has a molecular weight of at least 20,000.

8. A process as claimed in claim 1, in which the polymer is a copolymer of an alkyl acrylate and a hydroxy ethyl acrylate or methacrylate.

9. A process as claimed in claim 8 in which the polymeric material is a copolymer of butyl acrylate and hydroxy ethyl methacrylate.

10. A process as claimed in claim 1, in which the polymeric material is a copolymer of ethylene, an alkyl acrylate or methacrylate, and a hydroxy alkyl acrylate or methacrylate.

11. A process as claimed in claim 10, in which the polymeric material is a copolymer of ethylene, methyl methacrylate or ethyl acrylate, and hydroxy ethyl methacrylate.

12. A process as claimed in claim 1, in which the polyisocyanate is 4:4'-diphenylmethane diisocyanate or hexamethylene diisocyanate.

13. A process as claimed in claim 1, in which the vinyl monomer is selected from the group consisting of methyl methacrylate, styrene, and a combination of methyl methacrylate and styrene or acrylonitrile.

14. A process for the preparation of a shaped polymeric article which comprises forming a mixture which consists essentially of (1) from 1% to 60% by weight of the precursors of a crosslinked polyurethane, said precursors consisting essentially of (a) at least one polymer having a Tg of not more than 25°C, a molecular weight of at least 3,000 and which contains hydroxyl groups, and (b) at least one polyisocyanate cross-linking agent, and (2) from 99% to 40% by weight of at least one vinyl monomer which is free of groups which react with said hydroxyl containing polymer or said polyisocyanate, said precursors being soluble or dispersed in said vinyl monomer, reacting said precursors in said mixture to form a crosslinked polyurethane having a Tg of not more than 25°C and polymerizing said vinyl monomer to form a vinyl polymer, the reaction of said hydroxyl containing polymer with the polyisocyanate cross-linking agent being substantially completed before polymerization of said vinyl monomer is allowed to proceed to the extent that the vinyl polymer so produced forms a separate stage, and shaping said mixture while it is still fluid.

15. A shaped polymeric article produced by the process of claim 14.

16. A process as set forth in claim 14 in which said precursors of a cross-linked polyurethane include catalysts for the reaction of said polymer with said polyisocyanate.

17. A process as set forth in claim 14 in which said mixture includes a catalyst for the polymerization of said vinyl monomer.

18. A process as set forth in claim 14 in which said mixture contains a fibrous reinforcing agent.

* * * * *